(12) United States Patent
Fong

(10) Patent No.: US 12,129,397 B2
(45) Date of Patent: Oct. 29, 2024

(54) BUILD MATERIALS FOR PRINTING 3D ARTICLES

(71) Applicant: 3D SYSTEMS, INC., Rock Hill, SC (US)

(72) Inventor: John Fong, Temple City, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 18/348,033

(22) Filed: Jul. 6, 2023

(65) Prior Publication Data

US 2023/0357577 A1 Nov. 9, 2023

Related U.S. Application Data

(63) Continuation of application No. 17/523,301, filed on Nov. 10, 2021, now Pat. No. 11,739,221.

(60) Provisional application No. 63/114,118, filed on Nov. 16, 2020.

(51) Int. Cl.
| | |
|---|---|
| *C09D 4/06* | (2006.01) |
| *B29C 64/124* | (2017.01) |
| *B33Y 10/00* | (2015.01) |
| *B33Y 70/00* | (2020.01) |
| *C09D 133/26* | (2006.01) |
| *C09D 135/02* | (2006.01) |

(52) U.S. Cl.
CPC .............. *C09D 4/06* (2013.01); *B29C 64/124* (2017.08); *B33Y 10/00* (2014.12); *B33Y 70/00* (2014.12); *C09D 133/26* (2013.01); *C09D 135/02* (2013.01)

(58) Field of Classification Search
None
See application file for complete search history.

(56) References Cited

U.S. PATENT DOCUMENTS

| | | |
|---|---|---|
| 5,002,854 A | 3/1991 | Fan et al. |
| 8,182,882 B2 | 5/2012 | Johnson et al. |
| 8,334,025 B2 | 12/2012 | Fong et al. |
| 8,377,623 B2 | 2/2013 | Fong |
| 9,457,515 B2 | 10/2016 | Southwell et al. |
| 9,676,899 B2 | 6/2017 | Steeman et al. |
| 11,591,484 B1 | 2/2023 | Schaedler et al. |
| 2004/0013977 A1 | 1/2004 | Steinmann |
| 2005/0175925 A1 | 8/2005 | Johnson et al. |
| 2017/0327632 A1 | 11/2017 | Steeman et al. |
| 2020/0156311 A1 | 5/2020 | Rolland et al. |
| 2022/0055286 A1 | 2/2022 | Poeller et al. |

FOREIGN PATENT DOCUMENTS

| | | |
|---|---|---|
| CN | 109354849 | 2/2019 |
| JP | H03114733 A | 5/1991 |
| JP | 2005-523473 A | 8/2005 |
| JP | 2009-513764 A | 4/2009 |
| JP | 2009-535467 A | 10/2009 |
| JP | 2011-509313 A | 3/2011 |
| WO | 2020246489 A1 | 12/2020 |

OTHER PUBLICATIONS

PCT International Search Report for International Search Authority for PCT/US2021/058704, mailed Mar. 2, 2022 (6 pages).
PCT Written Opinion for International Search Authority for PCT/US2021/058704, malled Mar. 2, 2022 (7 pages).
EPO translation of Chinese Publication No. 109354849A, printed on Feb. 24, 2022 (11 pages).
English translation of Japanese First Office Action for Japanese Application No. 2023-527315, dated Mar. 21, 2024 (5 pages).

*Primary Examiner* — Sanza L. McClendon
(74) *Attorney, Agent, or Firm* — Maynard Nexsen PC

(57) ABSTRACT

Polymerizable liquids are described herein which, in some embodiments, can produce 3D printed articles of high resolution and desirable mechanical properties. In one aspect, a polymerizable liquid comprises an acrylate component, and a composite resin comprising a curable carrier and polymeric particles dispersed in the curable carrier. The polymerizable liquid also comprises a photoinitiator component.

18 Claims, No Drawings

BUILD MATERIALS FOR PRINTING 3D ARTICLES

CROSS REFERENCE TO RELATED APPLICATIONS

This application is a continuation of U.S. patent application Ser. No. 17/523,301, filed Nov. 10, 2021, which claims priority pursuant to 35 U.S.C. § 119 to U.S. Provisional Patent Application No. 63/114,118, filed Nov. 16, 2020, each of which is hereby incorporated by reference in its entirety.

FIELD

The present invention relates to three-dimensional build materials and, in particular, to polymerizable liquids for use with three-dimensional printing systems.

BACKGROUND 3D printers employ build materials, which are also known as inks, to form various 3D objects, articles, or parts in accordance with computer generated files. In some instances, the build material is solid at ambient temperatures and converts to liquid at elevated jetting temperatures. In other instances, the build material is liquid at ambient temperatures.

Build materials can comprise a variety of chemical species. Selection of chemical species to include in a build material can be selected according to various considerations including, but not limited to, desired chemical and/or mechanical properties of the printed article and operating parameters of the 3D printing apparatus. For example, ultra-violet (UV) curable acrylate formulations generally can print parts with high resolution on DLP systems. However, in many cases, the resulting parts lack desirable mechanical properties and can be prone to fracture or other degradative pathways. Such degradative pathways compromise article performance, leading to premature failure.

SUMMARY

In view of the foregoing, polymerizable liquids are described herein which, in some embodiments, can produce 3D printed articles of high resolution and desirable mechanical properties, including when such polymerizable liquids are used as a build material or ink. In one aspect, a polymerizable liquid comprises an acrylate component, and a composite resin comprising a curable carrier and polymeric particles dispersed in the curable carrier. The polymerizable liquid also comprises a photoinitiator component. In some embodiments, the acrylate component comprises acrylate monomer, acrylate oligomer, or mixtures thereof. Additionally, the curable carrier can comprise one or more points of unsaturation suitable for free radical polymerization. Alternatively, the curable carrier can undergo polymerization via a non-free radical mechanism.

In another aspect, methods of printing three-dimensional articles are described herein. In some embodiments, such a method comprises providing a polymerizable liquid comprising an acrylate component, a photoinitiator component, and a composite resin comprising a curable carrier and polymeric particles dispersed in the curable carrier. The polymerizable liquid is irradiated with light to form the article, the article comprising a polymeric composite including a polymeric matrix comprising an acrylate phase and cured carrier phase, wherein the polymeric particles are disposed in the polymeric matrix. In some embodiments, the article is formed via a layer-by-layer process, wherein layer formation is administered via deposition and irradiation of a layer of the polymerizable liquid.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

It is also to be understood that the article "a" or "an" refers to "at least one," unless the context of a particular use requires otherwise.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

In one aspect, polymerizable liquids for use in 3D printing applications are described herein. The polymerizable liquids, for example, can be employed in digital light processing (DLP), stereolithography (SLA), and multi-jet printing (MJP) printing applications, in some embodiments. A polymerizable liquid comprises an acrylate component, a photoinitiator component, and a composite resin comprising a curable carrier and polymeric particles dispersed in the curable carrier.

Turning now to specific components, the acrylate component can comprise one or a mixture of light polymerizable acrylate species. In some embodiments, for example, the acrylate component can comprise acrylate monomer, acrylate oligomer, or mixtures thereof. As known to the skilled artisan, a monomer is a single structural unit of a polymer or copolymer and is not an oligomer or polymer. In contrast, an oligomer comprises a plurality of chemically linked monomers. In some embodiments, the acrylate component can comprise monofunctional acrylates, difunctional acrylates, or mixtures thereof. In some embodiments, for instance, the acrylate component comprises methyl (meth)acrylate, ethyl (meth)acrylate, n-propyl (meth)acrylate, n-butyl (meth) acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy) ethyl acrylate, cyclohexyl methacrylate, 2-phenoxyethyl acrylate, glycidyl acrylate, isodecyl acrylate, 2-phenoxyethyl (meth)acrylate, lauryl methacrylate, or mixtures thereof. In some embodiments, the acrylate component comprises a monofunctional or difunctional aliphatic urethane (meth)acrylate.

The acrylate component, in some embodiments, can comprise one or more of allyl acrylate, allyl methacrylate, triethylene glycol di(meth)acrylate, tricyclodecane dimethanol diacrylate, and cyclohexane dimethanol diacrylate. Additionally, in some embodiments, the acrylate component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis (4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

Additional non-limiting examples of species suitable for inclusion in the acrylate component comprise the following: isobornyl acrylate (IBOA), commercially available from SARTOMER under the trade name SR 506A; isobornyl methacrylate, commercially available from SARTOMER under the trade name SR 423A; alkoxylated tetrahydrofurfuryl acrylate, commercially available from SARTOMER under the trade name SR 611; monofunctional urethane acrylate, commercially available from RAHN USA under the trade name GENOMER 1122; aliphatic urethane diacrylate, commercially available from ALLNEX under the trade name EBECRYL 8402; difunctional aliphatic urethane (meth)acrylate, commercially available from DYMAX under the BR-952 trade designation; triethylene glycol diacrylate, commercially available from SARTOMER under the trade name SR 272; and triethylene glycol dimethacrylate, commercially available from SARTOMER under the trade name SR 205. Other commercially available curable components may also be used. In addition, in some cases, a monofunctional or difunctional acrylate comprises an aliphatic polyester urethane acrylate oligomer, a urethane (meth)acrylate resin, and/or an acrylate amine oligomeric resin, such as EBECRYL 7100. In some embodiments, the acrylate component comprises one or more acrylate derivatives such as acryloylmorpholine.

In addition to the monofunctional and difunctional acrylate species components described above, it is also possible, in some cases, to include trifunctional or higher functional acrylate species in a polymerizable liquid described herein.

For example, in some instances, one or more tri(meth) acrylates may be used. However, it is to be understood that the functionality (i.e., mono-, di-, tri-, or higher functionality) and the molecular weight of the acrylate species described herein can be selected to provide a build material having a viscosity suitable for use in a desired 3D printing system. Non-limiting examples of trifunctional or higher (meth)acrylates that may be suitable for use in some embodiments described herein include 1,1-trimethylolpropane tri(meth)acrylate, ethoxylated or propoxylated 1,1,1-trimethylolpropanetri(meth)acrylate, ethoxylated or propoxylated glycerol tri(meth)acrylate, pentaerythritol monohydroxy tri(meth)acrylate, dipentaerythritol monohydroxy penta(meth)acrylate, bis(trimethylolpropane) tetra(meth)acrylate, and isocyanurate polyacrylate.

In some embodiments, the isocyanurate polyacrylate is of Formula I:

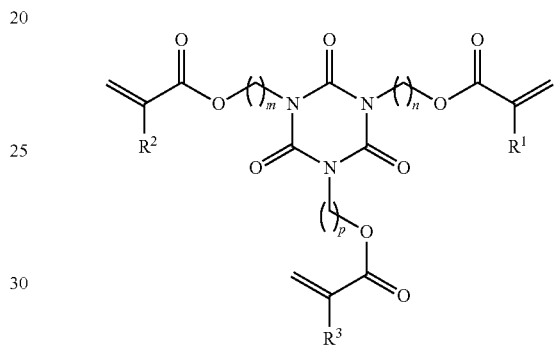

wherein $R^1$-$R^3$ are each independently selected from the group consisting of hydrogen and alkyl and m, n, and p are integers independently ranging from 1 to 10. In some embodiments, the isocyanurate polyacrylate is present in an amount of 20-40 wt. % based on total weight of the polymerizable liquid.

The acrylate component can be present in the polymerizable liquid in any amount consistent with the objectives described herein. In some embodiments, the acrylate component is present in an amount in an amount up to about 80 wt. %. For example, the acrylate component can be present in an amount of 20-80 wt. %, 30-70 wt. %, or 50-75 wt. % based on total weight of the polymerizable liquid. As described herein, the acrylate component can comprise a mixture of acrylate monomer and acrylate polymer, in some embodiments. Acrylate monomer, for example, can be present in an amount of 40-95 wt. % based on total weight of the acrylate component. Weight percent of acrylate monomer and acrylate oligomer can be varied according to the desired mechanical properties of the printed article, as demonstrated by the examples herein.

As described herein, the polymerizable liquid also comprises a composite resin comprising a curable carrier and polymeric particles dispersed in the curable carrier. A curable material, for reference purposes herein, comprises a chemical species that includes one or more curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" includes acrylate or methacrylate or a mixture or combination thereof.

Additionally, a monomeric curable material and/or an oligomeric curable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moieties; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties.

The curable carrier, in some embodiments, comprises unsaturated monomer, unsaturated oligomer, or mixtures thereof. The curable carrier, for example, can comprise unsaturated polyester, vinyl ester, or mixtures thereof. Alternatively, the curable resin may comprise one or epoxy species.

In some embodiments, the curable carrier is copolymerizable with the acrylate component. The curable carrier, for example, can comprise one or more sites of unsaturation for copolymerization with the acrylate component via free radical polymerization. In other embodiments, the curable component is not copolymerizable with the acrylate component. The curable component may undergo a polymerization mechanism different than the acrylate component or employ an initiator of different activation energy relative to the acrylate component.

As described herein, polymeric particles are dispersed in the curable carrier. The polymeric particles can be of any composition and/or architecture not inconsistent with achieving the technical objectives described herein. The polymeric particles can comprise elastomer, thermoplastic, thermoset or any combination thereof. Specific compositional identity of the polymeric particles can be selected according to the desired mechanical properties of the printed article. In some embodiments, the polymeric particles exhibit a core-shell architecture. The polymeric particles, for example, can comprise an elastomeric core and thermoplastic or thermoset shell. In some embodiments, composite resins comprising core-shell particles in a curable resin are commercially available from Kaneka Texas Corporation under the Kane Ace® MX trade designation. The polymeric particles may have any desired size. In some embodiments, the polymeric particles have a size less than 1 μm. The polymeric particles, for example, may have an average size of 50 nm to 500 nm. In other embodiments, the polymeric particles can have an average size greater than 1 μm, such as 5 μm to 50 μm.

The polymeric particles can be present in the curable carrier in any desired amount. In some embodiments, the polymeric particles are present in an amount of 20-70 wt. % or 30-60 wt. % based on total weight of the composite resin. Moreover, the composite resin can be present in the polymerizable liquid in any amount not inconsistent with the technical objectives described herein. The composite resin, for example, can be present in an amount of at least 20 wt. % or at least 30 wt. % based on total weight of the polymerizable liquid. In some embodiments, the composite resin is present in an amount of 20-70 wt. %, 25-65 wt. %, or 30-50 wt. % based on total weight of the polymerizable liquid.

The polymerizable liquid also comprises a photoinitiator component for initiating copolymerization of the acrylate component and monomeric curing agent upon exposure to light. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 420 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, polymerizable liquids containing ionic dye-counter ion compounds can be polymerized upon exposure to visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a polymerizable liquid described herein in any amount not inconsistent with the objectives of the present disclosure. In some embodiments, a photoinitiator is present in an amount of up to about 5 wt. %, based on the total weight of the polymerizable liquid. In some cases, a photoinitiator is present in an amount ranging from about 0.1 wt. % to about 5 wt. %.

Moreover, in some embodiments, a polymerizable liquid described herein can further comprise one or more sensitizers. A sensitizer can be added to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in the polymerizable liquid in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the polymerizable liquid.

In some embodiments, one or more UV-absorbers and/or light stabilizers can be present in the polymerizable liquid. In some embodiments, for example, one or more UV-absorbers and/or light stabilizers can be present in an amount of 0.1-2 wt. %, based on the total weight of the polymerizable liquid. In some embodiments, UV-absorbers and/or light stabilizers are commercially available from BASF of Florham Park, New jersey under the TINUVIN® trade-designation.

In another aspect, methods of printing a 3D article or object are described herein. Methods of printing a 3D article or object can include forming the 3D article from a plurality of layers of a polymerizable liquid described herein in a layer-by-layer manner. Any polymerizable material described herein may be used in the fabrication of the article by additive manufacturing.

In some embodiments, a method comprises providing a polymerizable liquid comprising an acrylate component, a photoinitiator component, and a composite resin comprising a curable carrier and polymeric particles dispersed in the curable carrier. The polymerizable liquid is irradiated with light to form the article, the article comprising a polymeric composite including a polymeric matrix comprising an acrylate phase and cured carrier phase, wherein the polymeric particles are disposed in the polymeric matrix. The acrylate component, photoinitiator component, and composite resin can have any composition and/or properties described herein. In some embodiments, the polymeric particles reside in the cured carrier phase of the polymeric matrix. Alternatively, the polymeric particles can be found in both the cured carrier phase and acrylate phase.

In some embodiments, the acrylate component and the curable resin are copolymerized to form the polymeric matrix. Alternatively, the acrylate component and curable resin are not copolymerized. In some embodiments, the acrylate component and curable resin form an interpenetrating network when polymerized. The acrylate component and curable resin, for example, can be simultaneously or sequentially polymerized to form the interpenetrating polymeric network.

In some embodiments, layers of polymerizable liquids can be deposited according to an image of the 3D article in a computer readable format during formation of the three-dimensional article. The polymerizable liquid can be deposited according to preselected computer aided design (CAD) parameters. Moreover, in some cases, one or more layers of the polymerizable liquid described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of a polymerizable liquid described herein onto a substrate, such as a build pad of a 3D printing system. In addition, in some embodiments, a method described herein further comprises supporting at least one of the layers of the polymerizable liquid with a support material. Any support material not inconsistent with the objectives of the present disclosure may be used.

It is also possible to form a 3D article from a polymerizable liquid described herein using stereolithography. For example, in some cases, a method of printing a 3D article comprises retaining the polymerizable liquid in a container and selectively applying energy to the polymerizable liquid in the container to solidify at least a portion of a polymerizable liquid, thereby forming a solidified layer that defines a cross-section of the 3D article. Additionally, a method described herein can further comprise raising or lowering the solidified layer to provide a new or second layer of polymerizable liquid, followed by again selectively applying energy to the polymerizable liquid in the container to solidify at least a portion of the new or second polymerizable liquid that defines a second cross-section of the 3D article. Further, the first and second cross-sections of the 3D article can be bonded or adhered to one another in the z-direction (or build direction corresponding to the direction of raising or lowering recited above) by the application of the energy for solidifying the polymerizable liquid. Moreover, selectively applying energy to the polymerizable liquid in the container can comprise applying electromagnetic radiation, such as UV and/or visible radiation, having a sufficient energy to initiate polymerization of the polymerizable material as described herein. In addition, in some cases, raising or lowering a solidified layer of polymerizable liquid is carried out using an elevator platform disposed in the container of fluid build material. A method described herein can also comprise planarizing a new layer of polymerizable liquid provided by raising or lowering an elevator platform. Such planarization can be carried out, in some cases, by a wiper or roller.

Articles printed according to methods described herein can exhibit one or more desirable mechanical properties. In some embodiments, a printed 3D article formed from polymerizable liquids described herein can exhibit an impact resistance of at least 0.9 ft.lb/in., in some embodiments. A 3D article, for example, can exhibit an impact resistance of 1-2 ft.lb/in., in some embodiments. Impact resistance can be determined accordint to ASTM D256, in some embodiments. In other embodiments, a 3D article can exhibit an impact resistance of 0.4-1.0 ft.lb/in.

Additionally, 3D articles printed from polymerizable liquids described herein can exhibit an elongation at break of at least 3%, at least 5% or at least 10%. In some embodiments, a printed 3D article has an elongation at break of 10-60%.

3D articles printed from polymerizable liquids described herein may also display a tensile modulus of at least 250 Ksi or at least 300 Ksi. In some embodiments, the tensile modulus of the 3D printed article is in the range of 250-500 Ksi. A 3D printed article, in some embodiments, can exhibit a tensile strength of at least 5,000 psi or at least 7,000 psi. Tensile strength of the printed 3D article, in some embodiments, is in the range of 7,000-12,000 psi.

In some embodiments, a 3D article printed from polymerizable liquids described herein can exhibit a flexural modulus at 25° C. of at least 1 500 MPa or at least 2000 MPa. Flexural modulus of the 3D article can be 1 500 to 3000 MPa or 2000 to 3200 MPa, in some embodiments. Values for flexural modulus, tensile strength and tensile modulus provided herein can be determined according to ASTM D638.

These foregoing embodiments are further illustrated in the following non-limiting examples.

EXAMPLES

Table 1 provides formulations of polymerizable liquids according to some embodiments described herein.

TABLE I

Polymerizable Liquids

| Component | Formula 1 | Formula 2 | Formula 3 | Formula 4 | Formula 5 | Formula 6 | Formula 7 |
|---|---|---|---|---|---|---|---|
| Polyacrylate isocyanurate | 28 | 28 | 28 | 28 | 28 | 35 | 36 |
| Acryloylmorpholine | 20 | 20 | 20 | 16.9 | 5 | 18 | 22 |
| Dicyclopentanyl acrylate | 12.2 | 12 | 10 | 6 | — | 6 | 8.1 |
| Difunctional urethane methacrylate | — | — | 5.9 | — | — | — | — |
| Difunctional tricyclodecanedimethanol diacrylate | — | — | — | — | 22.9 | — | — |
| Vinyl ester resin/core-shell elastomer particles | 35 | 35.9 | 32 | 45 | 40 | 37 | 30 |
| Photoinitiator | 3.2 | 3 | 3 | 3 | 3 | 3 | 3 |
| Light stabilizer/UV absorber | 1.5 | 1.1 | 1.1 | 1.1 | 1.1 | 1 | 0.9 |
| Total % weight | 99.9 | 100.0 | 100.0 | 100.0 | 100.0 | 100.0 | 100.0 |

Table II provides the physical properties of 3D articles printed using Formulas 1-7.

TABLE II

3D Printed Article Properties

| | Formula 1 | Formula 2 | Formula 3 | Formula 4 | Formula 5 | Formula 6 | Formula 7 |
|---|---|---|---|---|---|---|---|
| Tensile strength (psi) @ Peak | 9609 | 9873 | 10,472 | 9190 | 9058 | 10,482 | 10,792 |
| Tensile modulus (ksi) @ 1% Elongation | 342 | 351 | 368 | 318 | 356 | 358 | 396 |
| Average elongation (%) @ Break | 5.4 | 5.5 | 5.2 | 10 | 3.3 | 5.5 | 4.2 |
| Impact Resistance - Average (ft. lb./in.) | 0.5 | — | 0.44 | 0.55 | — | 0.55 | 0.41 |
| Viscosity at 30 C. (cps) | — | — | 270 | 380 | — | 370 | — |
| Tg (C.) | — | 106 | 111 | 104 | — | 106 | 116 |
| Flex-Modulus at 25° C. | — | 2235 | 2328 | 2107 | — | 2191 | 2810 |
| HDT 0.455 MPa by DMA (C) | — | 108 | 112 | 111 | — | 114 | 115 |
| HDT 1.82 MPa by DMA (C) | — | 91 | 94 | 90 | — | 96 | 88 |

Table III provides formulations of polymerizable liquids according to some embodiments described herein.

TABLE III

Polymerizable Liquids

| | Formula 8 | Formula 9 | Formula 10 | Formula 11 |
|---|---|---|---|---|
| Urethane diacrylate | 22 | — | 15 | 15 |
| Difunctional urethane methacrylate | — | 20 | 10 | 10 |
| Acryloylmorpholine | 16.9 | 16.9 | 16.9 | 17.9 |
| Dicyclopentanyl acrylate | 6 | 6 | 6 | 8 |
| Phenoxyethyl acrylate | 3 | 5 | — | — |
| Vinyl ester resin/core-shell elastomer particles | 48 | 48 | 48 | 45 |
| Photoinitiator | 3 | 3 | 3 | 3 |
| Light stabilizer/UV absorber | 1.1 | 1.1 | 1.1 | 1.1 |
| Total % weight | 100.0 | 100.0 | 100.0 | 100.0 |

Table IV provides the physical properties of 3D articles printed using Formulas 8-11.

TABLE IV

3D Printed Article Properties

| | Formula 8 | Formula 9 | Formula 10 | Formula 11 |
|---|---|---|---|---|
| Tensile strength (psi) @ Peak | 5973 | 7790 | 6764 | 7101 |
| Tensile modulus (ksi) @ 1% Elongation | 233 | 282 | 254 | 259 |
| Average elongation (%) @ Break | 44.0 | 12.4 | 23.8 | 28.4 |
| Impact Resistance - Average (ft. lb./in.) | 1.12 | 0.6 | 0.99 | 0.95 |
| Viscosity at 30 C. (cps) | — | — | — | 530 |
| Tg (C.) | — | 87 | 74 | 78 |
| Flex-Modulus at 25 C. | — | 1779 | 1601 | 1740 |
| HDT 0.455 MPa by DMA (C) | — | 85 | 72 | 73.5 |
| HDT 1.82 MPa by DMA (C) | — | 69 | 60 | 62 |

Additional non-limiting example embodiments are described below.

Embodiment 1. A polymerizable liquid comprising:
an acrylate component;
a composite resin comprising a curable carrier and polymeric particles dispersed in the curable carrier; and
a photoinitiator component.

Embodiment 2. The polymerizable liquid of Embodiment 1, wherein the acrylate component is present in an amount up to about 80 wt. % based on total weight of the polymerizable liquid.

Embodiment 3. The polymerizable liquid of Embodiment 1, wherein the acrylate component is present in an amount of 20-80 wt. % based on total weight of the polymerizable liquid.

Embodiment 4. The polymerizable liquid of Embodiment 1, wherein the acrylate component is present in an amount of 30-70 wt. % based on total weight of the polymerizable liquid.

Embodiment 5. The polymerizable liquid of any of the preceding Embodiments, wherein the acrylate component comprises a mixture of acrylate monomer and acrylate oligomer.

Embodiment 6. The polymerizable liquid of Embodiment 5, wherein acrylate monomer is present in an amount of 40-95 wt. % based on total weight of the acrylate component.

Embodiment 7. The polymerizable liquid of any of the preceding Embodiments, wherein the polymeric particles of the composite resin comprise elastomer.

Embodiment 8. The polymerizable liquid of any of the preceding Embodiments, wherein the polymeric particles exhibit a core-shell architecture.

Embodiment 9. The polymerizable liquid of Embodiment 8, wherein the polymeric particles comprise an elastomeric core.

Embodiment 10. The polymerizable liquid of Embodiment 9, wherein the polymeric particles comprise a thermoplastic shell.

Embodiment 11. The polymerizable liquid of Embodiment 9, wherein the polymeric particles comprise a thermoset shell.

Embodiment 12. The polymerizable liquid of any of the preceding Embodiments, wherein the polymeric particles are present in an amount of 20-60 wt. % based on total weight of the composite resin.

Embodiment 13. The polymerizable liquid of any of the preceding Embodiments, wherein the polymeric particles have an average size less than 1 μm.

Embodiment 14. The polymerizable liquid of any of the preceding Embodiments, wherein the polymeric particles have an average size of 50 nm to 500 nm.

Embodiment 15. The polymerizable liquid of any of the preceding Embodiments, wherein the curable carrier is polymerizable via free radical polymerization.

Embodiment 16. The polymerizable liquid of Embodiment 15, wherein the curable carrier comprises unsaturated monomer, unsaturated oligomer, or mixtures thereof.

Embodiment 17. The polymerizable liquid of Embodiment 15, wherein the curable carrier comprises unsaturated polyester, vinyl ester, or mixtures thereof.

Embodiment 18. The polymerizable liquid of Embodiment 15, wherein the curable carrier is copolymerizable with the acrylate component.

Embodiment 19. The polymerizable liquid of any of Embodiments 1-14, wherein the curable carrier is not copolymerizable with the acrylate component.

Embodiment 20. The polymerizable liquid of any of the preceding Embodiments, wherein the composite resin is present in an amount of 20-70 wt %. based on total weight of the polymerizable liquid.

Embodiment 21. A method of printing a three-dimensional article comprising:
providing the polymerizable liquid of any of claims 1-20;
irradiating the polymerizable liquid with light to form the article, the article comprising a polymeric composite material including a polymeric matrix comprising an acrylate phase and a cured carrier phase, wherein the polymeric particles are disposed in the polymeric matrix.

Embodiment 22. The method of Embodiment 21, wherein the polymerizable liquid is provided in a layer-by-layer process.

Embodiment 23. The method of Embodiment 21 or 22, wherein the acrylate component is present in the polymerizable liquid in an amount of 20-80 wt. % based on total weight of the polymerizable liquid.

Embodiment 24. The method of any of Embodiments 21-23, wherein the acrylate component comprises a mixture of acrylate monomer and acrylate oligomer.

Embodiment 25. The method of any of Embodiments 21-24, wherein the polymeric particles of the composite resin comprise elastomer.

Embodiment 26. The method of any of Embodiments 21-25, wherein the polymeric particles are present in an amount of 20-60 wt. % based on total weight of the composite resin.

Embodiment 27. The method of any of Embodiments 21-26, wherein the polymeric particles have an average size less than 1 μm.

Embodiment 28. The method of any of Embodiments 21-27, wherein the curable carrier comprises unsaturated polyester, vinyl ester, or mixtures thereof.

Embodiment 29. The method of any of Embodiments 21-28, wherein the acrylate component and curable carrier are copolymerized to form the polymeric matrix.

Embodiment 30. The method of any of Embodiments 21-29, wherein the acrylate phase and cured carrier phase form an interpenetrating network.

Embodiment 31. The method of any of Embodiments 21-30, wherein the printed article has an impact resistance of at least 0.5 ft.lb./in.

Embodiment 32. The method of any of Embodiments 21-31, wherein the printed article has an impact resistance of at least 1.0 ft.lb./in.

Embodiment 33. The method of any of Embodiments 21-32, wherein the printed article has an elongation at break of at least 10%.

Embodiment 34. The method of any of Embodiments 21-33, wherein the printed article has a tensile modulus of at least 250 Ksi.

Embodiment 35. The method of any of Embodiments 21-34, wherein the composite resin is present in an amount of 20-70 wt. % based on total weight of the polymerizable liquid.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A polymerizable liquid comprising:
an acrylate component;
a composite resin comprising a curable carrier and polymeric particles dispersed in the curable carrier; and
a photoinitiator component,
wherein the acrylate component is present in an amount of 30-70 wt. % based on a total weight of the polymerizable liquid, and
wherein the curable carrier is polymerizable via free radical polymerization.

2. The polymerizable liquid of claim 1, wherein the polymerizable liquid further comprises a UV-absorber and/or a light stabilizer.

3. The polymerizable liquid of claim 1, wherein the acrylate component comprises a monofunctional acrylate, a difunctional acrylate, or mixtures thereof.

4. The polymerizable liquid of claim 1, wherein the acrylate component comprises a trifunctional or higher functional acrylate.

5. The polymerizable liquid of claim 1, wherein the polymeric particles of the composite resin comprise an elastomer.

6. The polymerizable liquid of claim 1, wherein the polymeric particles exhibit a core-shell architecture.

7. The polymerizable liquid of claim 6, wherein the polymeric particles comprise an elastomeric core.

8. The polymerizable liquid of claim 7, wherein the polymeric particles comprise a thermoplastic shell.

9. A polymerizable liquid comprising:
an acrylate component;
a composite resin comprising a curable carrier and polymeric particles dispersed in the curable carrier; and
a photoinitiator component,
wherein the acrylate component is present in an amount of 30-70 wt. % based on a total weight of the polymerizable liquid;
wherein the polymeric particles exhibit a core-shell architecture;
wherein the polymeric particles comprise an elastomeric core; and
wherein the polymeric particles comprise a thermoset shell.

10. The polymerizable liquid of claim 1, wherein the polymeric particles are present in an amount of 20-60 wt. % based on a total weight of the composite resin.

11. The polymerizable liquid of claim 1, wherein the polymeric particles have an average size less than 1 μm.

12. The polymerizable liquid of claim 1, wherein the polymeric particles have an average size of 50 nm to 500 nm.

13. The polymerizable liquid of claim 1, wherein the curable carrier comprises unsaturated polyester, vinyl ester, or mixtures thereof.

14. The polymerizable liquid of claim 1, wherein the curable carrier is copolymerizable with the acrylate component.

15. The polymerizable liquid of claim 1, wherein the curable carrier is not copolymerizable with the acrylate component.

16. The polymerizable liquid of claim 1, wherein the composite resin is present in an amount of 20-70 wt. % based on a total weight of the polymerizable liquid.

17. A method of printing a three-dimensional article comprising:
providing the polymerizable liquid of claim 1, and
irradiating the polymerizable liquid with light to form the article, the article comprising a polymeric composite material including a polymeric matrix comprising an acrylate phase and a cured carrier phase, wherein the polymeric particles are disposed in the polymeric matrix.

18. A method of printing a three-dimensional article comprising:
providing a polymerizable liquid comprising an acrylate component, a composite resin comprising a curable carrier and polymeric particles dispersed in the curable carrier, and a photoinitiator component, wherein the acrylate component is present in an amount of 30-70 wt. % based on a total weight of the polymerizable liquid, and
irradiating the polymerizable liquid with light to form the article, the article comprising a polymeric composite material including a polymeric matrix comprising an acrylate phase and a cured carrier phase, wherein the polymeric particles are disposed in the polymeric matrix;
wherein:
the polymerizable liquid is provided in a layer-by-layer process;

the composite resin is present in the polymerizable liquid in an amount of 20-70 wt. % based on total weight of the polymerizable liquid;

the polymeric particles of the composite resin comprise an elastomer;

the polymeric particles are present in the composite resin in an amount of 20-60 wt. % based on total weight of the composite resin;

the polymeric particles have an average size less than 1 µm; and the curable carrier comprises unsaturated polyester, vinyl ester, or mixtures thereof.

\* \* \* \* \*